United States Patent [19]

Iwatani et al.

[11] Patent Number: 5,493,202
[45] Date of Patent: Feb. 20, 1996

[54] VOLTAGE REGULATOR DEVICE FOR VEHICULAR AC GENERATOR

[75] Inventors: Shirou Iwatani; Hirofumi Watanabe, both of Himeji, Japan

[73] Assignee: Mitsubishi Denki Kabushiki Kaisha, Tokyo, Japan

[21] Appl. No.: 216,719

[22] Filed: Mar. 23, 1994

[30] Foreign Application Priority Data

Mar. 25, 1993 [JP] Japan .................................. 5-066707

[51] Int. Cl.⁶ ............................ H02H 7/06; H02J 7/00
[52] U.S. Cl. .................. 322/28; 322/69; 322/99; 320/61
[58] Field of Search ............................ 322/60, 99

[56] References Cited

U.S. PATENT DOCUMENTS

| | | | |
|---|---|---|---|
| 4,471,287 | 9/1984 | Morishita et al. | 322/99 |
| 4,549,128 | 10/1985 | Morishita et al. | 322/99 |
| 5,132,605 | 7/1992 | Boella et al. | 322/99 |
| 5,184,060 | 2/1993 | Iwatani | 322/99 |

*Primary Examiner*—Steven L. Stephan
*Assistant Examiner*—Nicholas Ponomarenko
*Attorney, Agent, or Firm*—Sughrue, Mion, Zinn, Macpeak and Seas

[57] ABSTRACT

A voltage regulator circuit 3A for a vehicular AC generator 1 includes, in addition to the conventional voltage detector and transistors, a bypass PNP transistor 315 for supplying base current to the power transistor 305 upon disconnection of the line A from the battery 4. When the engine is started and the AC generator i is driven, a small voltage is induced in the armature coil 101 due to the residual magnetism in the core of the field coil 102 even when the line A is disconnected from the battery 4. A smoothed voltage developed at the junction point between a resistor 312 and a capacitor 313 coupled serially between a phase of the armature coil 101 and ground turns on the NPN transistor 311, thereby grounding the base of the PNP transistor 315 through a resistor 314. The PNP transistor 316 is thus turned on, and the base current of the power transistor 305 is supplied through the PNP transistor 315 via the bypass line B.

5 Claims, 2 Drawing Sheets

VOLTAGE REGULATOR DEVICE FOR VEHICULAR AC GENERATOR

BACKGROUND OF THE INVENTION

This invention relates to voltage regulator devices for vehicular AC generators, and more particularly to the the voltage regulator devices for AC generators with a simplified wiring system suitable to be used with internal combustion engines of agricultural and constructional machines.

FIG. 2 is a circuit diagram showing a conventional voltage regulator device for a vehicular AC generator. A voltage regulator device for a vehicular AC generator similar to that of FIG. 2 is described, for example, in Japanese Utility Model Publication (Kokoku) No. 62-30480. In FIG. 2, the AC output of the AC generator 1 including the armature coil 101 and the field coil 102 is rectified by a full-wave rectifier 2 including a main output terminal 201 and a grounded terminal 202. The output of the AC generator 1 is regulated to a predetermined voltage level by a voltage regulator circuit 3 including: voltage divider resistors 301 and 302 coupled in series, a Zener diode 303 coupled to the junction point $J_1$ between the resistors 301 and 302, a control transistor 304, a power transistor 305 for turning on and off the field current through the field coil 102, a resistor 306 and a surge suppression diode 307. The circuit of FIG. 2 further includes a battery 4 charged by the AC generator 1 and a key switch 5, the current supply to the electric load 6 of the vehicle being controlled by a load switch 7.

The operation of the circuit of FIG. 2 is as follows. When the key switch 5 is closed before starting the engine, the base current for the power transistor 305 is supplied from the battery 4 through the key switch 5 and resistor 306, and the power transistor 305 is turned on. As a result, the field current flows from the battery 4 through the field coil 102 and the power transistor 305 to ground, and a magnetomotive force is generated by the field coil 102.

When the engine is started and the AC generator 1 is driven, an AC output voltage is induced across the armature coil 101 corresponding to the rpm of the AC generator 1, which is rectified by the full-wave rectifier 2. When the output voltage of the full-wave rectifier 2 is below a predetermined level (e.g., 14.4 V), the voltage at the junction point $J_1$ between the resistors 301 and 302 is below the break down voltage of the Zener diode 303. The control transistor 304 is thus kept turned off. The power transistor 305 continues to be turned on and the supply of the field current to the field coil 102 is maintained. The output voltage of the AC generator 1 thus rises as the rpm of the engine increases.

When the output voltage of the AC generator 1 rises above the predetermined level (14.4 V) as a result of the increase in the rpm thereof, the voltage at the junction point $J_1$ between the resistors 301 and 302 rises to turn on the Zener diode 303, thereby supplying base current to the control transistor 304. The control transistor 304 is thus turned on, thereby grounding the base of the power transistor 305. As a result, the power transistor 305 is turned off, so as to interrupt the field current supplied to the field coil 102. The output voltage of the AC generator 1 thus falls. When the output voltage falls below the predetermined level, the Zener diode 303 and the control transistor 304 are again turned off, and the power transistor 305 is turned on. The field coil 102 is thus energized and the output voltage of the AC generator 1 again rises.

Repeating the above operation, the output of the AC generator 1 is controlled to the predetermined level (14.4 V), and the battery 4 is thus charged to the predetermined voltage level. The surge current developed across the field coil 102 upon interruption of the field current is absorbed by the suppression diode 307.

The voltage regulator device of FIG. 2, however, has the following disadvantage. Namely, when the base current supply line A is broken or a connector thereof is disconnected from the battery 4, the supply of base current to the power transistor 305 is no longer possible. As a result, the power transistor 305 remains continuously turned off, and the AC generator 1 stops generating power. Thus the battery 4 is continually discharged without being charged by the AC generator 1 any more, until the engine is finally halted.

SUMMARY OF THE INVENTION

It is therefore an object of this invention to provide a voltage regulator device for a vehicular AC generator which is capable of generating power and charging the battery even when the base current supply line is broken or the connector thereof is disconnected from the battery, such that the engine associated with the AC generator can be operated even after the disconnection of the base current supply line or the connector thereof from the battery.

The above object is accomplished in accordance with the principle of this invention by a voltage regulator device for a vehicular AC generator which includes: a first coil coupled to a rectifier circuit having output terminals coupled across battery means to charge the battery means; and a second coil coupled across the battery means to generate a magnetic field thereby to induce an output voltage across the first coil when supplied with a current from the battery means; the voltage regulator device including:

first switching element means, coupled in series with the second coil of the vehicular AC generator, for controlling a current supply from the battery means to the second coil;

output voltage level detector means, coupled across the output terminals of the rectifier circuit, for determining whether or not an output voltage across the output terminals of the rectifier circuit exceeds a predetermined reference level;

current supply line means, coupled across a terminal of the battery means and a control input terminal of the first switching element means, for providing a first supply of a control current to a control input terminal of the first switching element means, to turn on the first switching element means;

control means, having a control input terminal coupled to the output voltage level detector means, for turning off the first supply of the control current to the first switching element means when the output voltage across the output terminals of the rectifier circuit exceeds a predetermined reference voltage;

second switching element means coupled across an output of the rectifier circuit and the control input terminal of the first switching element means, for controlling a second supply of the control current to the first switching element means; and voltage generation detector means, coupled to the first coil of the vehicular AC generator, for detecting a presence of a voltage induced in the first coil, wherein the voltage generation detector means turns on the second switching element means upon detecting the presence of the voltage induced in the first coil, thereby supplying the second supply of the control current to the first switching element means through the second switching element means.

Preferably, the second switching element means consists of a first transistor, and the voltage generation detector means includes:

a serial circuit consisting of a resistor and a capacitor coupled across a point of the first coil of the vehicular AC generator and a ground level; and a second transistor coupled across a control terminal of the first transistor and a constant voltage level, the second transistor having a control terminal coupled to a junction point between the resistor and the capacitor.

As in the case of the conventional voltage regulator device, the first switching element means may a power transistor having a control terminal coupled to the battery means through the current supply line means, and the output voltage level detector means may includes: a voltage divider consisting of a pair of resistors coupled serially across the output terminals of the rectifier circuit; a control transistor coupled across the control terminal of the first switching element means and a constant voltage level; and a Zener diode coupled across a junction point between the pair of resistors of the voltage divider and a control terminal of the control transistor.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawings, like reference numerals represent like or corresponding parts or portions.

DETAILED DESCRIPTION OF THE PREFERRED EMBODIMENT

Referring now to the accompanying drawings, the preferred embodiment of this invention is described.

Figure 1:
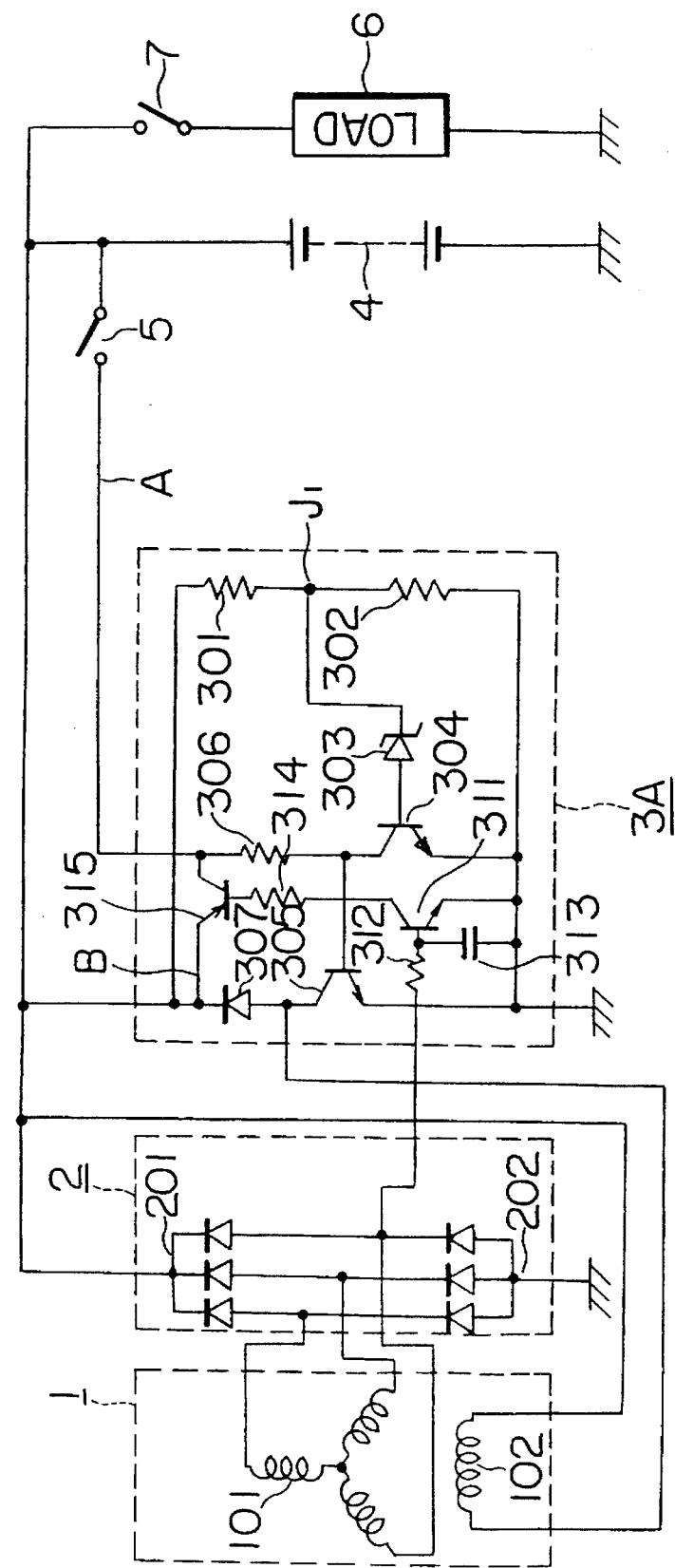
FIG. 1 is a circuit diagram showing a voltage regulator device for a vehicular AC generator according to this invention.

FIG. 1 is a circuit diagram showing a voltage regulator device for a vehicular AC generator according to this invention. The circuit of FIG. 1 is similar to the circuit of FIG. 2 except where specifically described as such.

Thus, the circuit of FIG. 1 includes an AC generator 1, a full-wave rectifier 2 and a voltage regulator circuit 3A. The AC generator 1 includes a three-phase armature coil 101 across which the output voltage is induced, and a field coil 102 which generates a magnetic field to induce the output voltage across the armature coil 101 when supplied with a field current. The full-wave rectifier 2 includes six diodes connected in a rectifier bridge circuit with the three phase windings of the armature coil 101, and thereby provides a rectified DC output voltage across the main output terminal 201 and the grounded terminal 202. The main output terminal 201 and the grounded terminal 202 of the full-wave rectifier 2 are coupled across the positive and ground terminals of the battery 4.

The voltage regulator circuit 3A includes components which is similar to the conventional voltage regulator circuit 3 of FIG. 1. Thus, the power transistor 305 is coupled in series with the field coil 102 across the main output terminal 201 and ground The voltage divider resistors 301 and 302 are coupled serially across the main output terminal 201 of the full-wave rectifier 2 and the ground. The junction point $J_1$ between the resistors 301 and 802 is coupled to the base of the control transistor 304 through a Zener diode 303. The control transistor 304 is coupled in series with the resistor 306 and the key switch 5 across the battery 4. The surge junction point between the resistor 306 and the control transistor 304 (i.e., the collector terminal of the control transistor 304) is coupled to the base of the power transistor 305. The surge suppression diode 307 is coupled across the field coil 102 to absorb the surge current generated across the field coil 102.

In addition to the above described conventional components, the voltage regulator circuit 3A includes: (a) voltage generation detector means for detecting the presence of an induced voltage in the armature coil 101; and (b) switching means for electrically connecting the main output terminal 201 of the full-wave rectifier 2 to the base resistor 306 of the power transistor 305 when the presence of voltage in the armature coil 101 is detected by the voltage detector means (a).

The switching means (b) consists of a PNP transistor 315 coupled in series with the resistor 306 across the main output terminal 201 of the full-wave rectifier 2 and the base of the power transistor 305.

On the other hand, the voltage generation detector means (a) for detecting the presence of a voltage in the armature coil 101 includes an NPN transistor 311, a resistor 312 and a capacitor 313. The resistor 312 and the capacitor 313 are coupled serially across a phase of the armature coil 101 and ground. The junction point between the resistor 312 and the capacitor 313 is coupled to the base of the NPN transistor 311. A resistor 314 and the NPN transistor 311 are coupled serially across the base of the PNP transistor 315 and ground.

Figure 2:
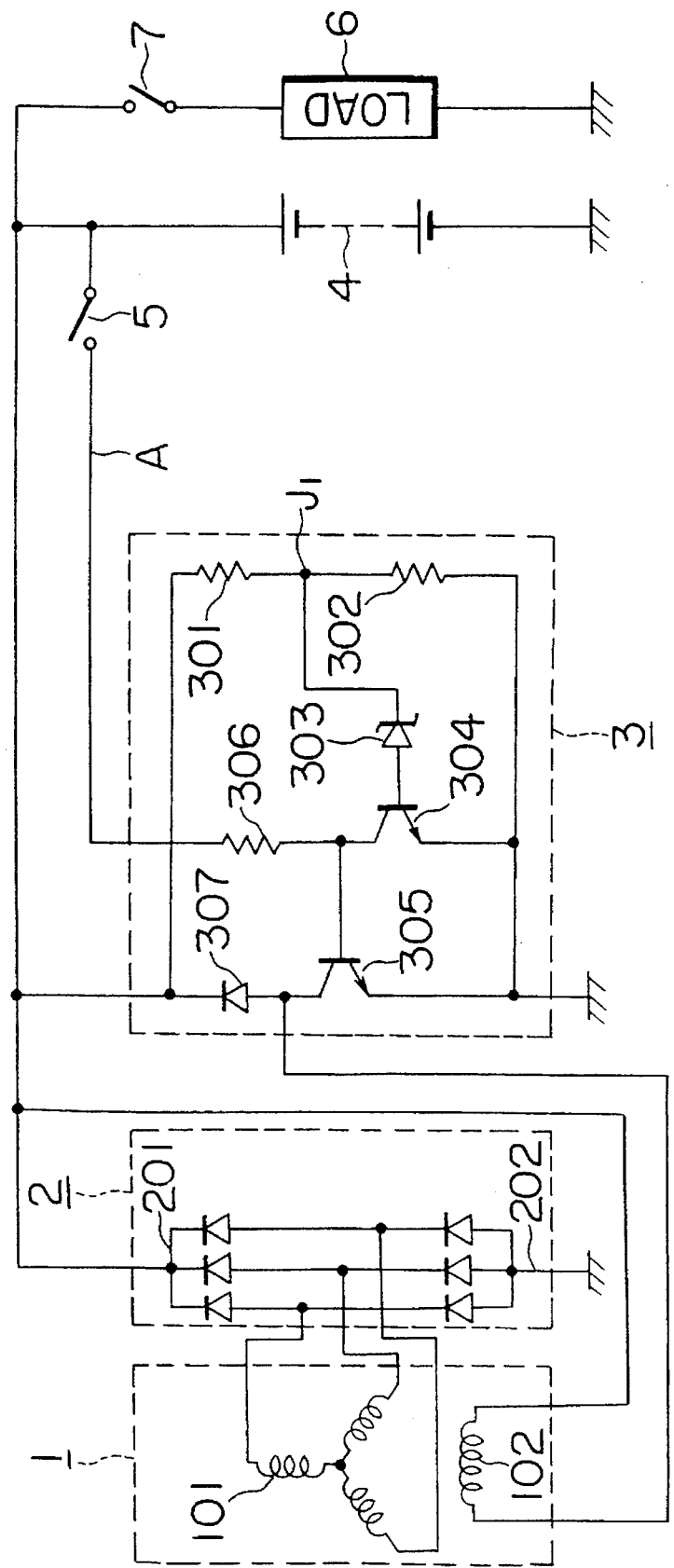
FIG. 2 is a circuit diagram showing a conventional voltage regulator device for a vehicular AC generator.

The battery 4, the key switch 5, the electric load 6 and the load switch 7 are the same as those of FIG. 2.

The operation of the voltage regulator circuit 3A is similar to that of the voltage regulator circuit 3 of FIG. 2 when the base current supply line A is properly coupled to the battery 4 through the key switch 5. Thus, when the key switch 5 is closed, the base current of the power transistor 305 is supplied from the battery 4 through the key switch 8 and the resistor 306 via the base current supply line A. The power transistor 305 is thus turned on to supply the field current therethrough from the battery 4 to the field coil 102. The Zener diode 303 and hence the control transistor 304 are turned off to keep the power transistor 305 turned on, while the output voltage of the full-wave rectifier 2 is below a predetermined reference level (14.4 V). When, on the other hand, the output voltage across the full-wave rectifier 2 exceeds the reference voltage, the Zener diode 303 and hence the control transistor 304 are turned on, thereby turning off the power transistor 305. The ON/OFF switching of the power transistor 305 controls the supply of the field current flowing through the field coil 102, and the output voltage of the full-wave rectifier 2 is regulated to the predetermined reference level and charges the battery 4 to the predetermined reference level.

When an output voltage is generated in the armature coil 101 after the engine is started to drive the AC generator 1, the PNP transistor 315 is turned on, as will become apparent from the following description of the operation where the base current supply line A or the connector thereof is disconnected from the battery 4. The ON/OFF switching of the PNP transistor 315, however, does not affect the ON/OFF switching of the power transistor 305 in any essential way provided that the base current supply line A is securely connected to the battery 4.

The operation of the voltage regulator circuit 3A in the case where the base current supply line A is broken or the connector thereof is disconnected from the battery 4 is as follows.

Before the engine is started to drive the AC generator 1, no voltage is induced in the armature coil 101 of the AC generator 1 and hence no voltage is developed across the capacitor 313. Thus, the NPN transistor 311 is turned off. Consequently, the PNP transistor 315 is also turned off, and the base current of the power transistor 305 is not supplied as long as the key switch 5 is made to start the engine. The field current is thus not supplied to the field coil 102.

However, the core of the field coil 102 retains remanence magnetization. Thus, when the engine is started and the rpm of the AC generator 1 rises, a small phase voltage (about 1 V) is generated at the output terminal of each phase winding of the armature coil 101 due to the residual magnetic field produced by the core of the field coil 102. The output terminals of the phases of the armature coil 101 are coupled in the rectifier bridge circuit with the six diodes of the full-wave rectifier 2, and the negative output terminal 202 of the full-wave rectifier 2 is grounded. Thus, the voltage level of the phase of the armature coil 101 coupled to the resistor 312, which changes essentially sinusoidally as the AC generator 1 is rotated, is kept above the ground level. The small positive voltage generated at the output terminal of the phase of the armature coil 101 coupled to the resistor 312 charges the capacitor 313 through the resistor 312. Thus, a smoothed positive voltage is developed at the junction point between the resistor 312 and the capacitor 313, and turns on the NPN transistor 311, thereby grounding the base of the PNP transistor 315 through the resistor 314. The PNP transistor 315 is thus turned on. As a result, the base current is supplied from the battery 4 to the base of the power transistor 305 through the PNP transistor 315 and the resistor 306 via the auxiliary base current supply line B. The operation of the voltage regulator circuit 3A after the PNP transistor 315 is turned on is similar to the normal operation thereof. The AC generator 1 thus generates an AC voltage and charges the battery 4 to the predetermined voltage.

The circuit of FIG. 1 may be modified within the scope of this invention. For example, the resistor 312 may be coupled to the neutral point at the center of the Y-connected armature coil 101.

What is claimed is:

1. A voltage regulator device for a vehicular AC generator, including a first coil (101) coupled to a rectifier circuit (2) having output terminals (201,202) coupled across battery means (4) for charging said battery means, and a second coil (102) coupled across said battery means for generating a magnetic field to thereby induce an output voltage across said first coil when supplied with a current from said battery means; said voltage regulator device comprising:

a) first switching element means (305) coupled in series with said second coil of said vehicular AC generator for controlling a current supply from said battery means to said second coil;

b) output voltage level detector means (301–303) coupled across said output terminals of said rectifier circuit for determining whether or not an output voltage across said output terminals of said rectifier circuit exceeds a predetermined reference level;

c) current supply line means (A) coupled between a terminal of said battery means and a control input terminal of said first switching element means for providing a first control current to the control input terminal of said first switching element means to turn on said first switching element means;

d) control means (304) having an input terminal coupled to said output voltage level detector means for turning off said first control current to said first switching element means when said output voltage across said output terminals of said rectifier circuit exceeds said predetermined reference voltage; and e) means for supplying a second control current to the control input terminal of the first switching element means upon an interruption in said current supply line means and an attendant interruption of said first control current, said second control current supplying means comprising:

1) second switching element means (315) coupled between an output of said rectifier circuit and said control input terminal of said first switching element means for controlling the supply of said second control current to said first switching element means; and 2) voltage generation detector means (311–313) coupled to said first coil of said vehicular AC generator for detecting a presence of a voltage induced in said first coil by residual magnetism in said second coil, wherein said voltage generation detector means turns on said second switching element means upon detecting said presence of said voltage induced in said first coil such that said second control current is supplied to said first switching element means through said second switching element means.

2. A voltage regulator device as claimed in claim 1, wherein said second switching element means comprises a first transistor.

3. A voltage regulator device as claimed in claim 2, wherein said voltage generation detector means comprises:

a serial circuit including a resistor and a capacitor coupled between said first coil of said vehicular AC generator and ground; and a second transistor coupled between a control terminal of said first transistor and a constant voltage level source, said second transistor having a control terminal coupled to a junction point between said resistor and said capacitor.

4. A voltage regulator device as claimed in claim 1, wherein said first switching element means comprises a transistor having a control terminal coupled to said battery means through said current supply line means.

5. A voltage regulator device as claimed in claim 2, wherein:

said output voltage level detector means comprises a voltage divider including a pair of resistors coupled in series across said output terminals of said rectifier circuit;

said control means comprises a control transistor coupled between said control terminal of said first switching element means and a constant voltage level source; and said output voltage level detector means further comprises a Zener diode coupled between a junction point between said pair of resistors of said voltage divider and a control terminal of said control transistor.

* * * * *